United States Patent [19]
Murgatroyd

[11] 3,807,921
[45] Apr. 30, 1974

[54] APPARATUS FOR MANUFACTURING FOAMED PLASTIC MATERIALS

[75] Inventor: Harry H. Murgatroyd, Cambridge, Ohio

[73] Assignee: Phillips Petroleum Company, Bartlesville, Okla.

[22] Filed: Mar. 13, 1972

[21] Appl. No.: 234,032

[52] U.S. Cl.................. 425/159, 425/245, 425/817
[51] Int. Cl............................................. B28b 17/00
[58] Field of Search .......... 425/181, 232, 245, 247, 425/378, 380, DIG. 224, DIG. 229, 242, 249, 250, 119, 164, 135, 145, 251, 817; 249/109, 110, 107

[56] References Cited
UNITED STATES PATENTS

| | | | |
|---|---|---|---|
| 3,608,151 | 9/1971 | Cloutier | 425/119 |
| 2,770,011 | 11/1956 | Kelly | 425/DIG. 229 |
| 2,912,719 | 11/1959 | Gilmore | 425/DIG. 229 |
| 3,091,812 | 6/1963 | Witkowski | 249/110 X |

*Primary Examiner*—J. Spencer Overholser
*Assistant Examiner*—John S. Brown

[57] ABSTRACT

Foamed plastic articles are formed in a mold containing at least two unequal volume cavities by utilizing separate gate valves which are actuated sequentially.

7 Claims, 3 Drawing Figures

APPARATUS FOR MANUFACTURING FOAMED PLASTIC MATERIALS

This invention relates to apparatus and method for molding foamed plastic articles. In a specific aspect this invention relates to a method of molding foamed plastic articles having unequal volumes.

Simultaneous filling of mold cavities with foamable plastic materials wherein the mold cavities are of unequal volumes results in the formation of foamed articles which exhibit undesirable variations in product density, cell structure, skin thickness, surface appearance, as well as the formation of foamed articles of incomplete form and size. An additional disadvantage associated with prior art apparatus, particularly apparent during the opening of the mold cavity to eject the finished foamed plastic article, is the characteristic of the apparatus permitting drooling of foamable thermoplastic material from the polymer melt reservoirs into the open mold cavities. This indiscriminate drooling of thermoplastic material into the various mold cavities further aggravates the problem of molding a uniform product.

It is an object of this invention to provide method and apparatus which will provide for the efficient molding and ejecting of foamed plastic articles from molds containing mold cavities of unequal volumes. Another object of the invention is to produce foamed articles which are uniform in product density, cell structure, and skin thickness, and have excellent surface appearance. A further object of the invention is to produce foamed articles in a mold having multiple cavities of differing volume such that the foamed articles are individually complete and are identical with the mold design of the respective mold cavity.

Other aspects, objects and advantages of the present invention will become apparent from a study of the disclosure, the appended claims and the drawings.

Figure 1:
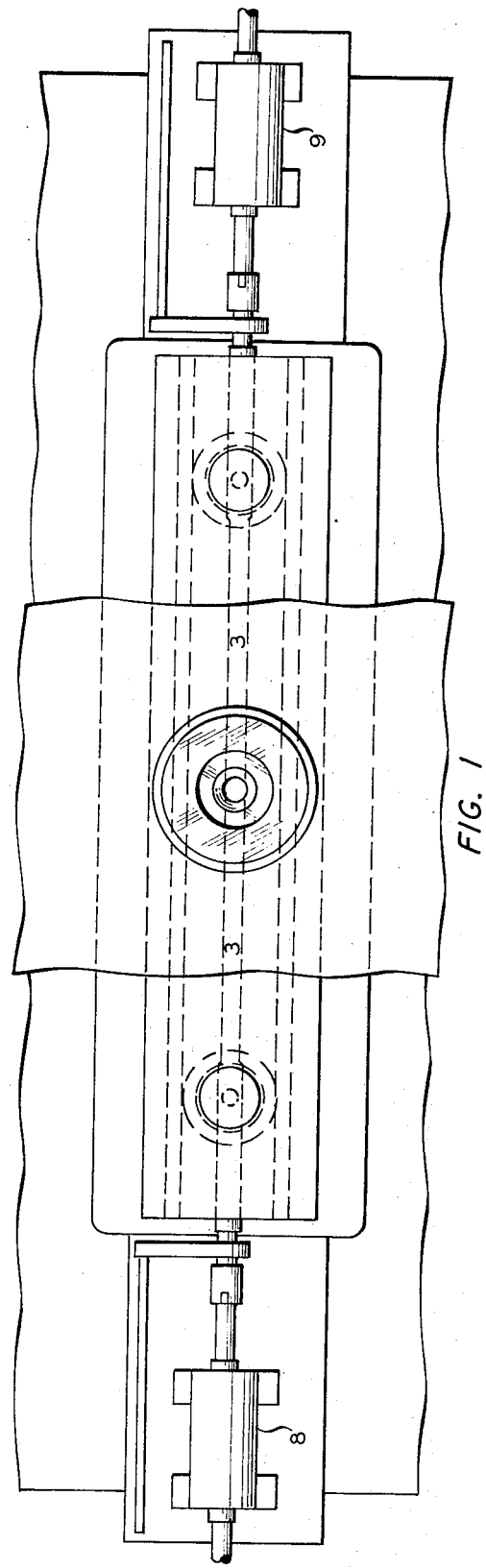
Figure 2:
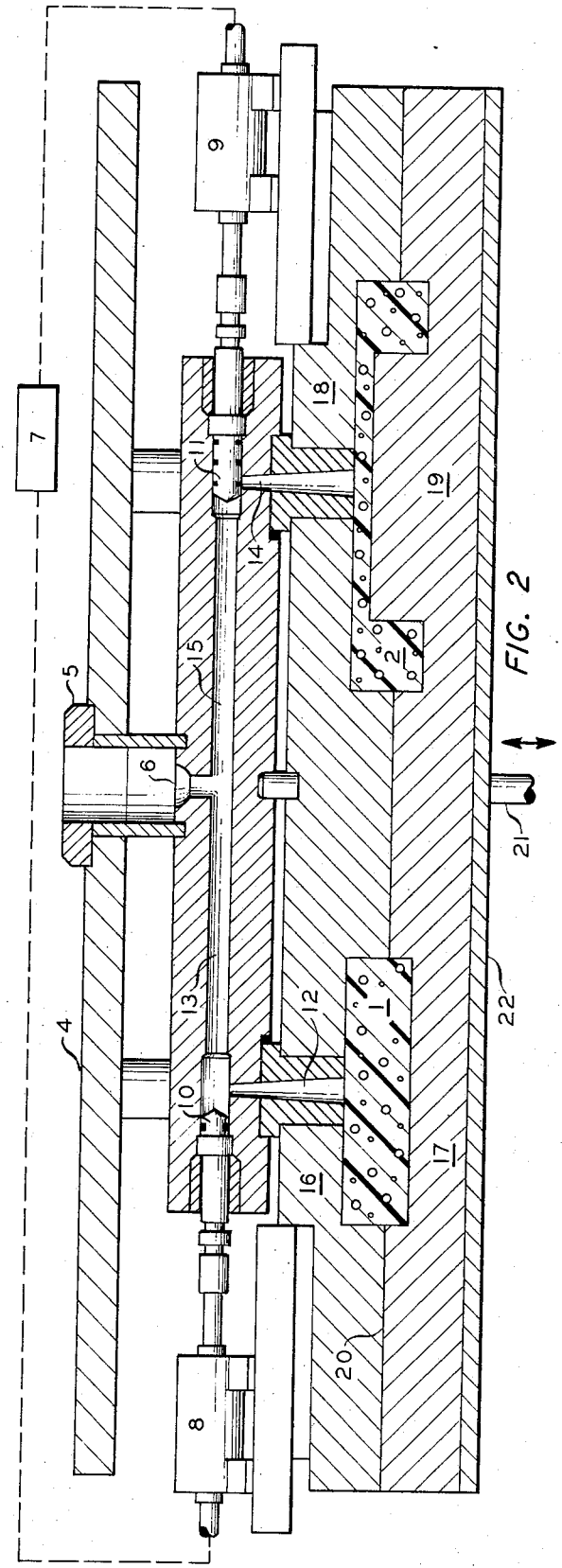
Figure 3:
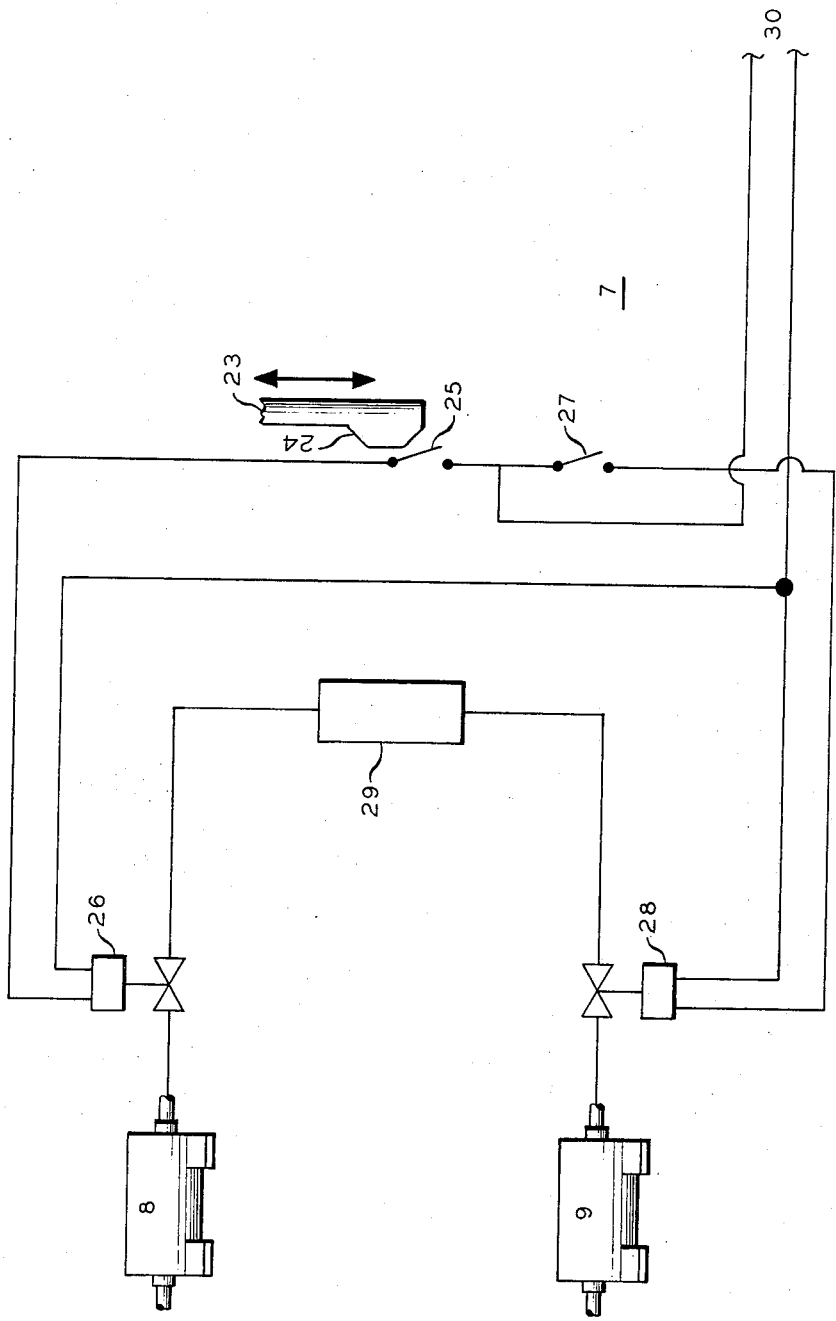

In the drawings FIGS. 1 and 2 are a plan view and an elevation view, respectively, of a molding apparatus having a control means for sequentially opening and closing individually mold cavities of unequal volumes. FIG. 3 is a schematic representation of a control means which can be employed with the apparatus of FIGS. 1 and 2.

Referring now to FIGS. 1 and 2, there is illustrated an injection molding apparatus having a first mold cavity 1 connected to a second mold cavity 2 by means of a hot runner passageway 3. Mold cavities 1 and 2 are of significantly different volumes. The mold support plate 4 is provided with primary sprue sleeve 5 to receive the nozzle of an injection molding machine (not shown). Passageway 6 connects sprue sleeve 5 to the hot runner passageway 3. The hot runner passageway 3 comprises a first passageway 13 and a second passageway 15. The first passageway 13 is connected to the first mold cavity 1, and the second passageway 15 is connected to the second mold cavity 2. Mold cavity 1 is formed by the closing of stationary first mold cavity section 16 and movable second mold cavity section 17 in abutting relationship along parting line 20. Mold cavity 2 is formed by the closing of stationary third mold cavity section 18 and the movable fourth mold cavity section 19. Second mold cavity section 17 is operably connected to fourth mold cavity section 19 so as to permit both movable mold cavity sections to be operated to permit ejection of molded articles from said first mold cavity 1 and said second mold cavity 2 simultaneously. One or more of mold cavity sections 16, 17, 18, and 19 can contain a protrusion such as that illustrated by mold cavity section 19 in order to describe a core cavity relationship with respect to a mating mold cavity section. When the first valve 10 is in its illustrated open position, molten thermoplastic material containing a foaming agent flows uninterruptedly from sprue sleeve 5 through the first passageway 13 and secondary sprue 12 into the first mold cavity 1, and conversely when the valve 10 is in its closed position the plastic material does not flow into first mold cavity 1. Similarly, when the second valve 11 is in its open position, molten thermoplastic material containing a foaming agent flows from sprue sleeve 5 through passageway 15 and secondary sprue 14 into the second mold cavity 2, and conversely when the second valve 11 is in its illustrated closed position the flow of material into mold cavity 2 is interrupted. Control means 7, illustrated in detail in FIG. 3, is connected to first hydraulic cylinder 8, which operates valve 10, and to second hydraulic cylinder 9 which operates second valve 11. As thermoplastic material containing a foaming agent is injected into sprue 5, the control means 7 sequentially opens first valve 10, permitting the foamable plastic to form a foamed article corresponding to the configuration of the first mold cavity 1, while second valve 11 is maintained in its closed position. Subsequent to the formation of the first article, control means 7 closes first valve 10 and opens second valve 11 to permit the formation of a second article in mold cavity 2. Following the completion of the second article in second mold cavity 2, control means 7 closes second valve 11. With both first valve 10 and second valve 11 in their closed positions, second mold cavity section 17 and fourth mold cavity section 19 are separated from first mold cavity section 16 and third mold cavity section 18 respectively to permit the ejection of the first and second foamed articles. In order to facilitate separating, the mold cavity sections 17 and 19 can be mounted on a platen 22, and a shaft 21, or other power transmissions means, can be attached to platen 22. The hydraulic system of the injection molding machine, not shown, provides a power system that is compact and easily adjustable to maintain the desired pressure between the mold cavity sections during injection molding of the foamable thermoplastic material and the desired relative separating travel rates during opening of the mold sections.

Referring to FIG. 3, the control means 7 of FIG. 2 comprises a rod 23 that moves in unison with the flow of foamable plastic material from the injection molding machine into sprue 5, the rod 23 being provided with a cam 24. A first normally open switch 25 is contacted by cam 24 to energize first solenoid valve 26 which activates first hydraulic cylinder 8 to move valve 10 to its open position. When switch 25 is not contacted by cam 24, first solenoid valve 26 is deenergized, thereby deactivating first hydraulic cylinder 8 to move valve 10 to its closed position. A second normally open switch 27 is contacted by cam 24 to energize second solenoid valve 28 which activates the second hydraulic cylinder 9 to move second valve 11 to its open position. When switch 27 is not contacted by cam 24, second solenoid valve 28 is deenergized, which deactivates second hydraulic cylinder 9 to move valve 11 to its closed position. A hydraulic power source 29 and an electrical energy source 30 are provided.

In the operation of this invention, referring to FIG. 2, injection molding of foamed plastic articles of substantially different volumes can be carried out by moving mold cavity sections 17 and 19 to their closed positions and then injecting molten thermoplastic material containing a foaming agent into spure sleeve 5. Valve 10 is initially opened while valve 11 remains closed to permit the material to flow into first mold cavity 1 to form a first formed article. Subsequently, by means of control means 7, valve 10 is closed and concurrently or shortly thereafter second valve 11 is opened whereby said material flows into the second mold cavity 2 to form a second foamed article. After the formation of the second article, control means 7 closes valve 11. After cooling, the first and third mold cavity sections 16,18 are separated from the second and fourth mold cavity sections 17,19 by a force applied by means of shaft 21 to permit the ejection of the molded articles.

Other modifications and alterations of this invention will be apparent to those skilled in the art from the foregoing discussion and accompanying drawings, and accordingly it should be understood that this invention is not to be unduly limited thereto.

What is claimed is:

1. An apparatus for forming and ejecting a plurality of foamed plastic articles which comprises first and second mold cavity sections, said second mold cavity section being movable between a first, closed position at which the first and second mold cavity sections form a first mold cavity for the molding of a first foamed article, and a second, open position wherein said first and second mold cavity sections are separated from each other to permit the ejection of the first foamed article; third and fourth mold cavity sections, said fourth mold cavity section being operably connected to said second mold cavity section and being movable in conjunction with said second mold cavity section between a first, closed position at which the third and fourth mold cavity sections form a second mold cavity for the molding of a second foamed article and a second, open position wherein the third and fourth mold cavity sections are separated from each other to permit the ejection of the second foamed article simultaneous with the ejection of said first foamed article, said first and second mold cavities being of significantly different volumes; source means for providing molten thermoplastic material containing a foaming agent; first passageway means for connecting said first mold cavity and said source means; second passageway means for connecting said second mold cavity and said source means; a first valve means operatively located in said first passageway means; a second valve means operatively located in said second passageway means; means for moving said second and fourth mold cavity sections to their respective first closed positions; actuating means for moving said first valve means to an open position to permit the flow of molten thermoplastic material from said source means into said first mold cavity while said second valve means is maintained in its closed position and then for closing said first valve means and opening said second valve means to permit the flow of molten thermoplastic into said second mold cavity while said first valve means is maintained in its closed position, said actuating means comprising a rod associated with a cam and first and second switch means, said rod being movable in conjunction with the flow of thermoplastic material into said first and second mold cavities, and said first and second switch means being sequentially operated by the movement of said cam; and means for removing said second and fourth mold cavity sections from the first and third mold cavity sections respectively to permit the removal of the thus formed foamed articles.

2. An apparatus in accord with claim 1 wherein the means for actuating said first valve comprises a first hydraulic cylinder, and the means for actuating said second valve comprises a second hydraulic cylinder, together with a control means for manipulating said first and second hydraulic cylinders.

3. An apparatus in accord with claim 1 wherein said second and fourth cavity sections contain protrusions which in combination with said first and third cavity sections describe a core cavity relationship.

4. An apparatus in accord with claim 1 wherein the source means for providing molten thermoplastic material containing a foaming agent is an injection molding machine.

5. An apparatus in accord with claim 1 wherein first passageway means and said second passageway means comprise a hot runner passageway.

6. An apparatus in accord with claim 1 wherein said means for moving said second and fourth mold cavity sections to their respective first closed position and the means for removing said second and fourth mold cavity sections from the first and third mold cavity sections, respectively, to permit the removal of the formed articles comprises an injection molding machine.

7. The apparatus of claim 2 wherein said actuating means further comprises first and second solenoid valve means, said first switch means being operably connected through said first solenoid valve means and said first hydraulic cylinder to said first valve and said second switch means being operably connected through said second solenoid valve means and said second hydraulic cylinder to said second valve, said first and second switch means being juxtaposed to said cam attached to said rod so that as said cam is moved by said rod it sequentially contacts said first switch to open said first valve releases said first switch to close said first valve, contacts said second switch to open said second valve and releases said second switch to close said second valve.

* * * * *